United States Patent
Hamada et al.

(10) Patent No.: US 7,172,048 B2
(45) Date of Patent: Feb. 6, 2007

(54) AIRBAG APPARATUS FOR PEDESTRIAN PROTECTION

(75) Inventors: Makoto Hamada, Toyota (JP); Toshiaki Hosoya, Toyota (JP); Hideya Innami, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 201 days.

(21) Appl. No.: 10/473,156

(22) PCT Filed: Mar. 27, 2003

(86) PCT No.: PCT/IB02/00957

§ 371 (c)(1),
(2), (4) Date: Sep. 29, 2003

(87) PCT Pub. No.: WO02/079009

PCT Pub. Date: Oct. 10, 2002

(65) Prior Publication Data

US 2005/0257979 A1   Nov. 24, 2005

(30) Foreign Application Priority Data

Mar. 29, 2001   (JP) .............................. 2001-095188

(51) Int. Cl.
*B60K 28/10* (2006.01)
*B60R 21/34* (2006.01)

(52) U.S. Cl. ..................... 180/274; 180/271; 280/743.2
(58) Field of Classification Search ................ 180/274, 180/271; 280/730.1, 728.1, 743, 2; B60R 21/34

See application file for complete search history.

(56) References Cited

U.S. PATENT DOCUMENTS 5,676,395 A * 10/1997 Oe et al. ................. 280/730.2
6,182,782 B1   2/2001 Matsuura et al.

FOREIGN PATENT DOCUMENTS

| DE | 26 137 48 | 10/1977 |
|----|-----------|---------|
| DE | 196 28 837 | 1/1997 |
| GB | 2 316 371 | 2/1998 |
| JP | 07108903 | 4/1995 |
| JP | 07156749 | 6/1995 |
| JP | 09164906 | 6/1997 |
| JP | 10071912 | 3/1998 |
| JP | 11240407 | 9/1999 |
| JP | 2000264146 | 9/2000 |
| JP | 2003063334 A * | 3/2003 |
| JP | 2003252141 A * | 9/2003 |

* cited by examiner

*Primary Examiner*—Paul N. Dickson
*Assistant Examiner*—Tiffany Webb
(74) *Attorney, Agent, or Firm*—Finnegan, Henderson, Farabow, Garrett & Dunner L.L.P.

(57) ABSTRACT

An airbag apparatus for pedestrian protection 18 including an airbag body 22 disposed along a vertical direction is disposed in an upper portion 16A of each of right and left front pillars 16. The expansion of the airbag body 22 toward the outer side of the vehicle is restrained to a predetermined amount by a cloth 22C connecting an attachment portion 22A of the airbag body 22 with a sewn portion 22B when the airbag body 22 is expanded. Thus, the airbag body 22 is expanded along the outer peripheral portion. In addition, a portion of the airbag body 22 expanded toward approximately the outer side in the lateral direction contacts a curved portion 30F expanded toward the inner side in the lateral direction, which is in a deployment portion 30A of a garnish panel 30. Thus, the airbag body 22 is expanded toward approximately the inner side in the lateral direction to a large extent.

23 Claims, 18 Drawing Sheets

AIRBAG APPARATUS FOR PEDESTRIAN PROTECTION

BACKGROUND OF THE INVENTION

1. Field of the Invention

The invention relates to an airbag apparatus for pedestrian protection, and more particularly to an airbag apparatus for pedestrian protection which absorbs and reduces an impact on a pedestrian at a second collision with a vehicle body when the running vehicle collides with the pedestrian.

2. Description of Related Art

Conventional art related to an airbag for pedestrian protection is disclosed in Japanese Patent Laid-Open Publication No. 7-108903.

As shown in FIG. 18, this airbag for pedestrian protection includes a vehicle-to-pedestrian collision detection sensor attached to a front bumper, an airbag body 202 which is expanded toward the outer side of a front pillar 200 when the vehicle-to-pedestrian collision detection sensor detects a collision with a pedestrian, and an inflator which expands and deploys the airbag body 202. When the vehicle-to-pedestrian collision detection sensor detects a collision, the inflator generates gas to expand the airbag body 202 so that the airbag body 202 may cover a front portion 200A of the front pillar 200 as shown by a chain double-dashed line in FIG. 18. Thus, the impact on the pedestrian is reduced.

However, in this airbag apparatus for pedestrian protection, a component force acts toward the outer side of the vehicle and obliquely rearward (i.e., in the direction shown by an arrow Y in FIG. 18) in the airbag body 202 when a pedestrian collides with the airbag body 202 from approximately the front of the vehicle (i.e., in the direction shown by an arrow X in FIG. 18). As a result, the airbag body 202 is moved toward the rear of the vehicle as shown by a dashed line, thereby reducing a portion between the pedestrian and the front pillar 200. Therefore, performance of reducing the impact on the pedestrian decreases.

SUMMARY OF THE INVENTION

In view of this, it is an object of the invention to provide an airbag apparatus for pedestrian protection which can improve performance of reducing an impact on a pedestrian.

An airbag apparatus for pedestrian protection according to a first aspect of the invention includes a cover which is provided in a surface of the front pillar, the surface being on the outside of the vehicle, and covers the airbag body, and whose deployment portion is deployed toward the outer side in the lateral direction when the airbag body is expanded; and an expanding direction control means which expands the airbag body toward approximately the inner side in the lateral direction and maintains the airbag body in the expanded position.

Therefore, when a pedestrian collides with the airbag body from approximately the front of the vehicle, the airbag body is expanded toward the inner side in the lateral direction, and is maintained in the expanded position by the expanding direction control means.

This ensures that the airbag body lies between the pedestrian and the front pillar, thereby reducing the impact on the pedestrian.

Further, in the airbag for pedestrian protection according to the first aspect of the invention, the expanding direction control means may be a contact portion contacting the airbag body, which is in a deployment portion of the cover.

In this case, since the airbag body contacts the contact portion provided in the deployment portion of the cover, the airbag body is deployed toward the inner side in the lateral direction and is maintained in the expanded position when a pedestrian collides with the airbag body from approximately the front of the vehicle body. This ensures that the airbag body lies between the pedestrian and the front pillar, thereby improving the performance of reducing the impact on the pedestrian. In addition, the construction is simplified by using the contact portion contacting the airbag body, which is in the deployment portion of the cover, as the expanding direction control means.

Furthermore, the contact portion may be expanded toward approximately the inner side in the lateral direction to have a curved shape at the time of deployment.

In this case, since the airbag body contacts the curved portion of the cover expanded toward approximately the inner side in the lateral direction at the time of deployment, the airbag body is expanded toward the inner side in the lateral direction and is maintained in the expanded position when a pedestrian collides with the airbag body from approximately the front of the vehicle. This ensures that the airbag body lies between the pedestrian and the front pillar, thereby improving the performance of reducing the impact on the pedestrian.

Also, in the airbag apparatus for pedestrian protection according to the first aspect of the invention, the expanding direction control means may be a connecting member which connects a portion of the vehicle body laterally inside the front pillar with the airbag body, and which generates a tension between the connected portions when the airbag body is expanded.

In this case, the airbag body is expanded toward the inner side in the lateral direction and is maintained in the expanded position by the tension generated by the connecting member which connects the portion of the vehicle body laterally inside the front pillar with the airbag. This ensures that the airbag body lies between the pedestrian and the front pillar, thereby improving the performance of reducing the impact on the pedestrian. In addition, it is also possible to reliably maintain a portion of the airbag body protruding from the cover in the expanded position by using the connecting member.

An airbag apparatus for pedestrian protection according to a second aspect of the invention includes a cover which is provided in a surface of a cowl portion, the surface being on the outside of the vehicle, and covers the airbag body, and whose deployment portion is deployed toward the rear of the vehicle when the airbag body is expanded; and an expanding direction control means which expands the airbag body toward the front of the vehicle and maintains the airbag body in the expanded position.

Therefore, the airbag body is expanded toward the front of the vehicle and is maintained in the expanded position by the expanding direction control means when a pedestrian collides with the airbag body from the front of the vehicle. This ensures that the airbag body lies between the pedestrian and the cowl portion, thereby improving the reducing the impact on the pedestrian.

In the airbag apparatus for pedestrian protection according to the second aspect of the invention, the expanding direction control means may be a connecting member which connects a portion of the vehicle body ahead of the cowl portion with the airbag body, and generates a tension between the connected portions when the airbag is expanded.

In this case, the airbag body is expanded toward the front of the vehicle and is maintained in the expanded position by the tension generated by the connecting member which connects the portion of the vehicle body ahead of the cowl portion with the airbag body. This ensures that the airbag body lies between the pedestrian and the cowl portion, thereby reducing the impact on the pedestrian. In addition, it is also possible to reliably maintain a portion of the airbag body protruding from the cover in the expanded position by using the connecting member.

BRIEF DESCRIPTION OF THE DRAWINGS

The foregoing and further objects, features and advantages of the invention will become apparent from the following description of a preferred embodiment with reference to the accompanying drawings, wherein like numerals are used to represent like elements and wherein.

DETAILED DESCRIPTION OF PREFERRED EMBODIMENTS

Hereinafter, an airbag apparatus for pedestrian protection according to a first embodiment of the invention will be described with reference to FIG. 1 to FIG. 6.

It is to be noted that an arrow FR indicates the front of the vehicle, an arrow UP indicates the upper side of the vehicle, and an arrow IN indicates the inner side in the lateral direction.

Figure 4:
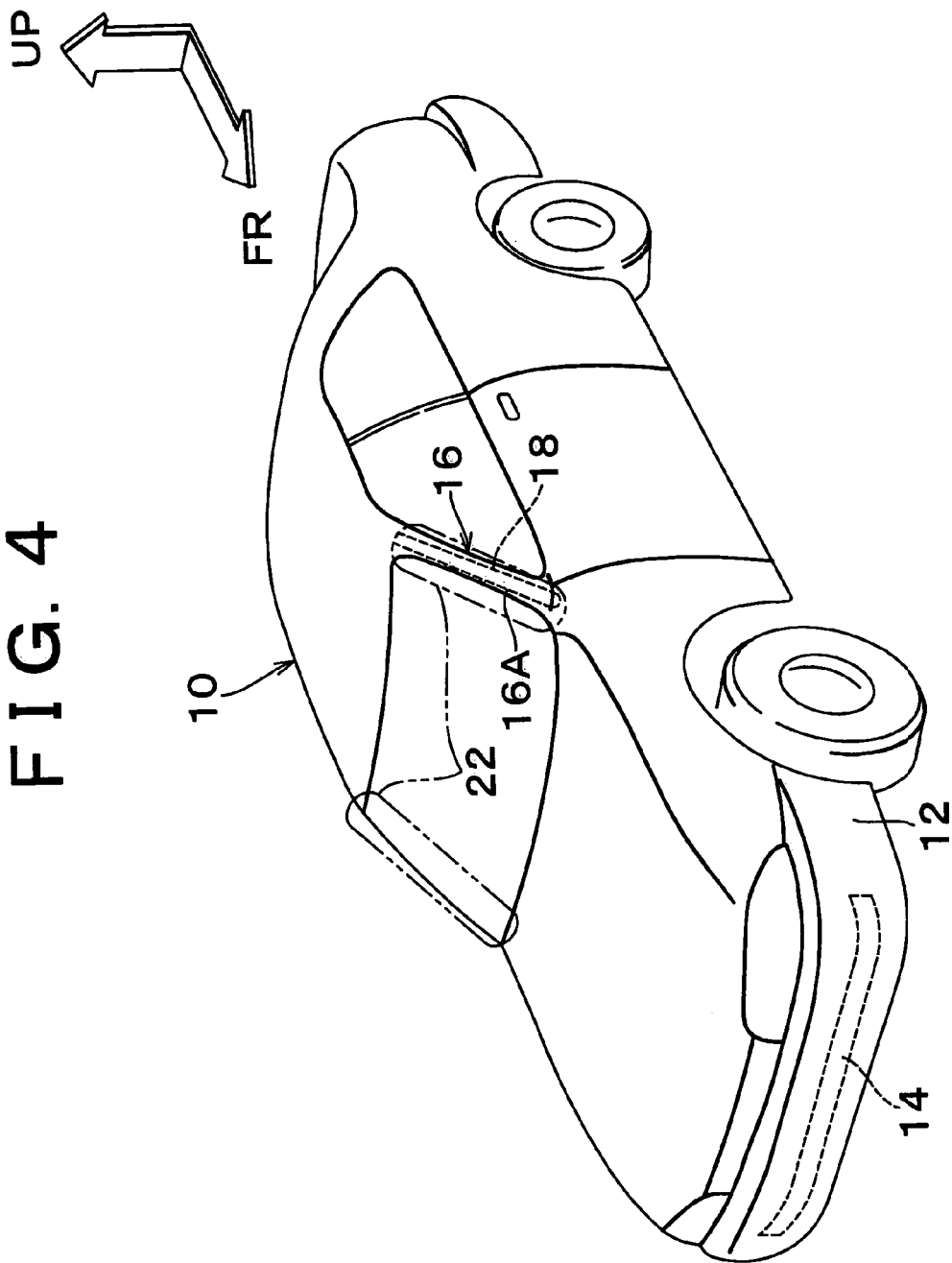
FIG. 4 is a perspective view showing a vehicle body to which the airbag apparatus for pedestrian protection according to the first embodiment of the invention is applied, as obliquely viewed from ahead of the vehicle.

As shown in FIG. 4, in the first embodiment, a vehicle-to-pedestrian collision detection sensor 14 is disposed in a front bumper 12 of a vehicle body 10. An airbag apparatus for pedestrian protection 18 is disposed along the vertical direction in an upper portion 16A of each of right and left front pillars 16.

Figure 3:
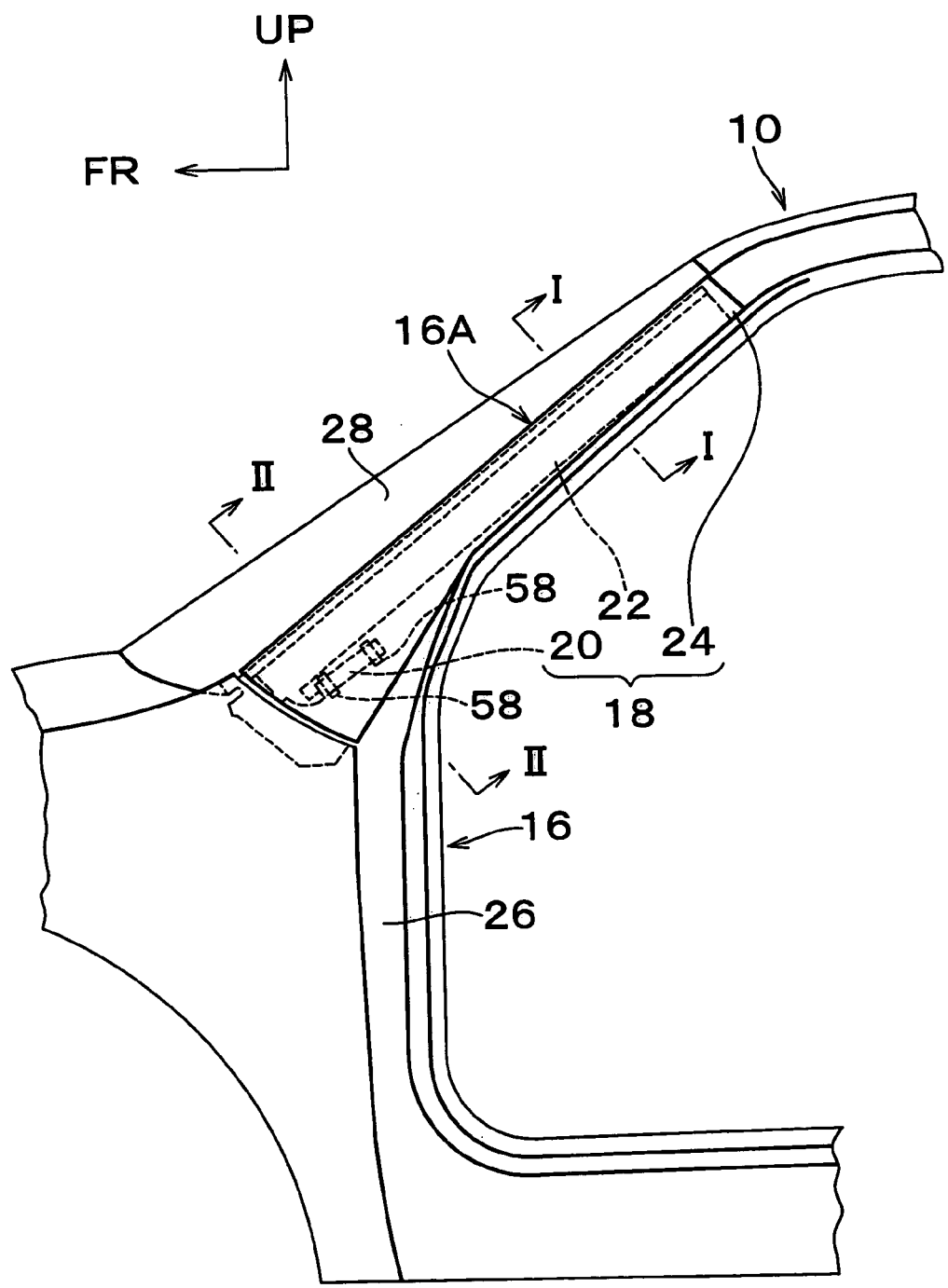
FIG. 3 is a lateral view showing a part of a vehicle body to which an airbag apparatus for pedestrian protection according to a first embodiment of the invention is applied.

As shown in FIG. 3, the airbag apparatus for pedestrian protection 18 mainly includes an inflator 20 which operates to inject gas based on a detection signal from the vehicle-to-pedestrian collision detection sensor 14; an airbag body 22, and a case 24 which houses the airbag body 22. When the vehicle-to-pedestrian collision detection sensor 14 detects a collision with a pedestrian, the inflator 20 operates, whereby gas flows into the airbag body 22. Then, the airbag body 22 is expanded forward from the upper portion 16A of the front pillar 16 as shown by chain double-dashed line in FIG. 4.

A fender 26 is attached to the vehicle body 10, and windshield glass 28 is attached to the front pillar 16.

Figure 1:
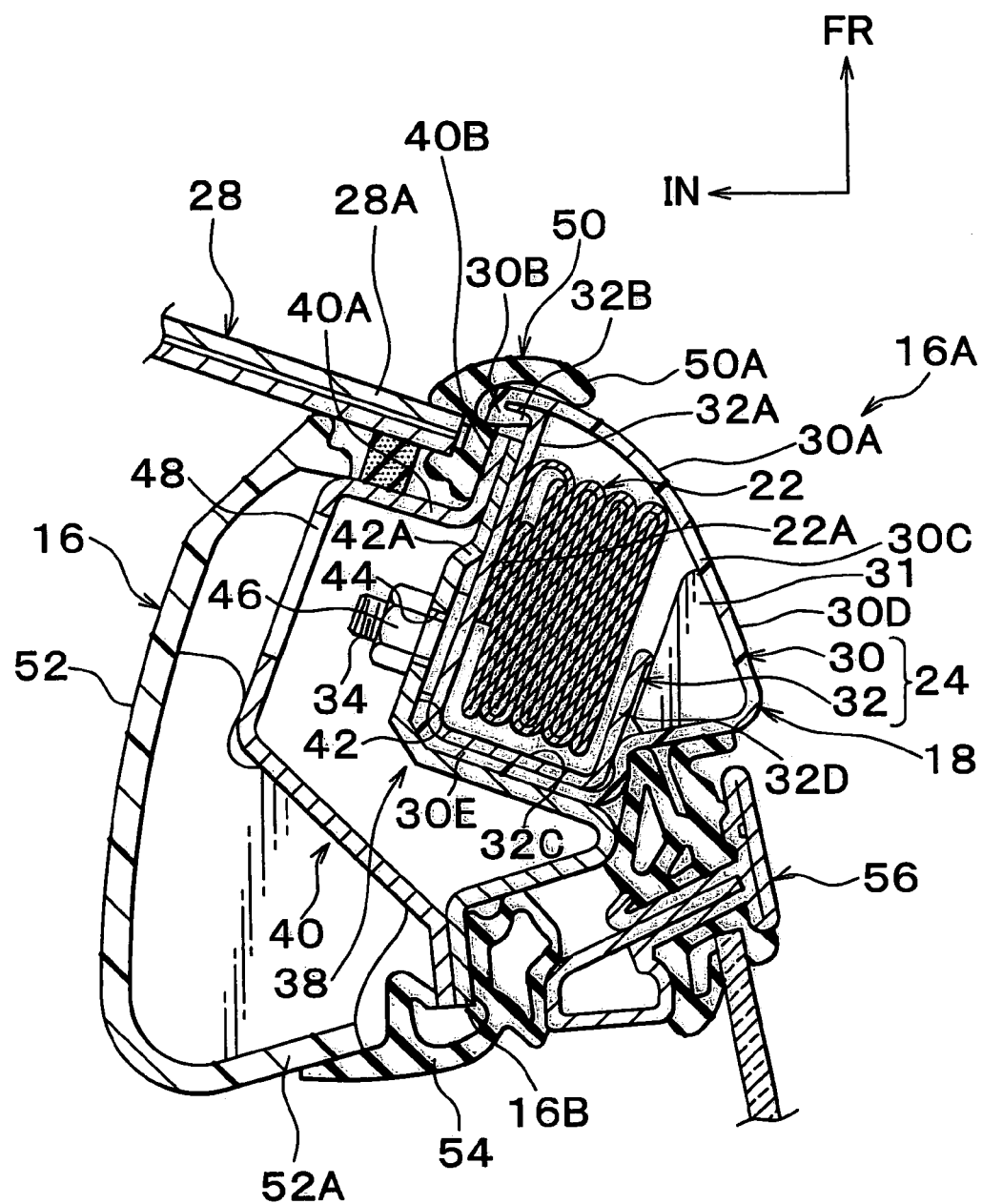
FIG. 1 is an enlarged sectional view taken on line I—I of FIG. 3.

As shown in FIG. 1, the airbag body 22 is accordion-folded to have a long shape and is housed in the case 24. The case 24 is composed of a garnish panel 30 which is made from resin material and constitutes a surface of the front pillar 16, the surface being on the outside of the vehicle; and a base plate 32 which includes a metal plate to which an attachment portion 22A of the airbag body 22 is fixed by welding or other means.

The base plate 32 has a recessed and opened cross section whose opening is directed toward the front and the outer side in the lateral direction. The attachment portion 22A of the airbag body 22 is fixed to the inner peripheral surface of a first wall portion 32A on the laterally inner side of the base plate 32. An engagement portion 32B directed toward the outer side of the opening of the base plate 32 is formed in the end portion of the opening of the first wall portion 32A. A bolt 34 is erected in a portion of the first wall portion 32A, which is adjacent to a base portion 32C of the base plate 32, at its outer peripheral surface. A second wall portion 32D on the laterally outer side of the base plate 32 is shorter than the first wall portion 32A on the laterally inner side.

A deployment portion 30A of the garnish panel 30 constitutes a decorative surface of the upper portion 16A of the front pillar 16, the decorative surface being on the outside of the vehicle. The deployment portion 30A covers the accordion-folded airbag body 22. A pawl portion 30B is formed in a first end portion on the laterally inner side of the deployment portion 30A, and the pawl portion 30B is engaged with the engagement portion 32B of the base plate 32.

The deployment portion 30A has a second end portion 30C on its outer side in the lateral direction, and has a portion 30D outside the second end portion 30C in the lateral direction. A rib 31 having a triangle shape is formed in the inner peripheral portion of the portion 30D. An attachment portion 30E extends toward the inner side in the lateral direction behind the portion 30D where the rib 31 is formed. The attachment portion 30E of the garnish panel 30 is bonded to the base portion 32C of the base plate 32 by an adhesive which serves also as a sealant.

Figure 5:
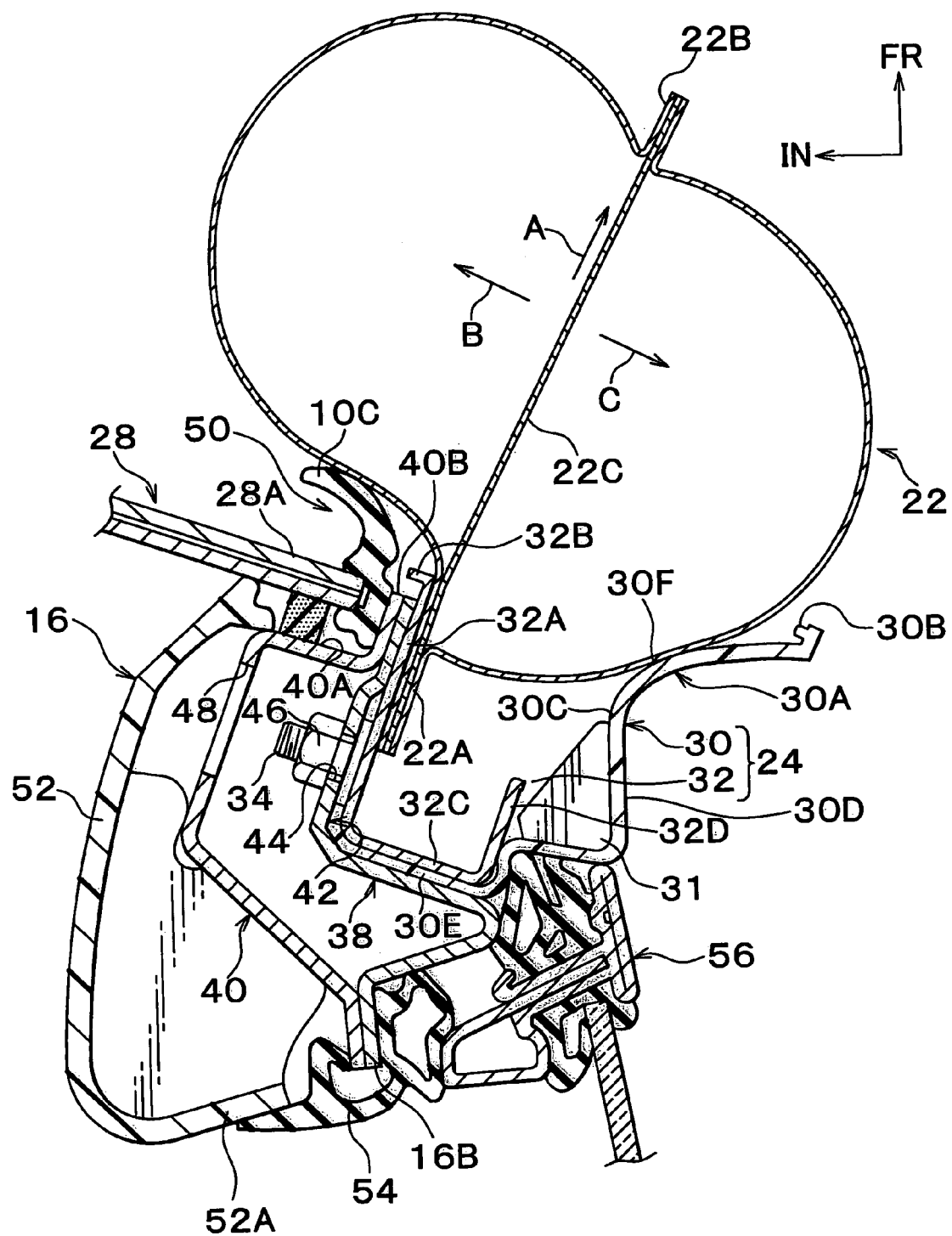
FIG. 5 is an enlarged sectional view showing the deployed state of the airbag apparatus for pedestrian protection according to the first embodiment of the invention.

Therefore, when the airbag body is expanded, the pawl portion 30B of the deployment portion 30A of the garnish panel 30 is disengaged from the engagement portion 32B of the base plate 32 due to the expansion pressure of the airbag body. 22 as shown in FIG. 5. Then, the deployment portion 30A is deployed from the second end portion 30C toward the outer side in the lateral direction at a predetermined angle. In addition, the airbag body 22 has a cloth 22C which connects the attachment portion 22A of the airbag body 22 with a sewn portion 22B. Therefore, when the airbag body 22 is expanded, the cloth 22C restricts the expansion of the airbag body 22 toward the outer side of the vehicle (i.e., in the direction shown by an arrow A in FIG. 5) to a predetermined amount, and thus the airbag body 22 is expanded along the outer peripheral portion of the vehicle (in the directions shown by an arrow B and an arrow C in FIG. 5). Further, a portion of the airbag body 22 expanded toward approximately the outer side in the lateral direction (i.e., in the direction shown by the arrow C in FIG. 5) contacts a curved portion 30F expanded toward approximately the inner side in the lateral direction in the deployment portion 30A, and the curved portion 30F serves as the expanding direction control means.

The upper portion 16A of the front pillar 16 has a closed cross section and includes a front pillar outer panel 38 disposed on the vehicle compartment exterior side; and a front pillar inner panel 40 disposed on the vehicle compartment interior side. An airbag apparatus for pedestrian protection 18 is disposed in a recessed portion 42 having an L-shape cross section formed in the front pillar outer panel 38. An attachment hole 44 is formed in a vertical wall portion 42A of the recessed portion 42 which is approximately perpendicular to an edge portion 28A located on the laterally outer side of windshield glass 28. A nut 46 is screwed to a bolt 34 extending through attachment hole 44, thereby fixing the airbag apparatus for pedestrian protection 18. An operation hole 48 which is used when the nut 46 is fastened is formed in the front pillar inner panel 40.

An edge portion 28A on the laterally outer side of the windshield glass 28 is fixed to a front wall portion 40A of the front pillar inner panel 40. A flange 40B directed toward approximately the front is formed in an end portion on the laterally outer side of the front wall portion 40A. A weather strip molding 50 is disposed between the flange 40B and the end portion 28A on the laterally outer side of the windshield glass 28. An end portion 50A on the laterally outer side of the weather strip molding 50 covers a portion where the pawl portion 30B of the deployment portion 30A is engaged with the engagement portion 32B of the base plate 32. A front pillar garnish 52 is disposed on the vehicle compartment interior side of the front pillar inner panel 40. A rear end edge portion 52A of the front pillar garnish 52 is engaged with a weather strip molding 54 disposed in a joint flange 16B in the rear of the upper portion 16A of the front pillar 16. As shown in FIG. 1, a front side door 56 is attached laterally outside the front pillar outer panel 38.

As shown in FIG. 3, the inflator 20 is cylindrical, and brackets 58 are fixed near both ends of the inflator 20 in the longitudinal direction.

Figure 2:
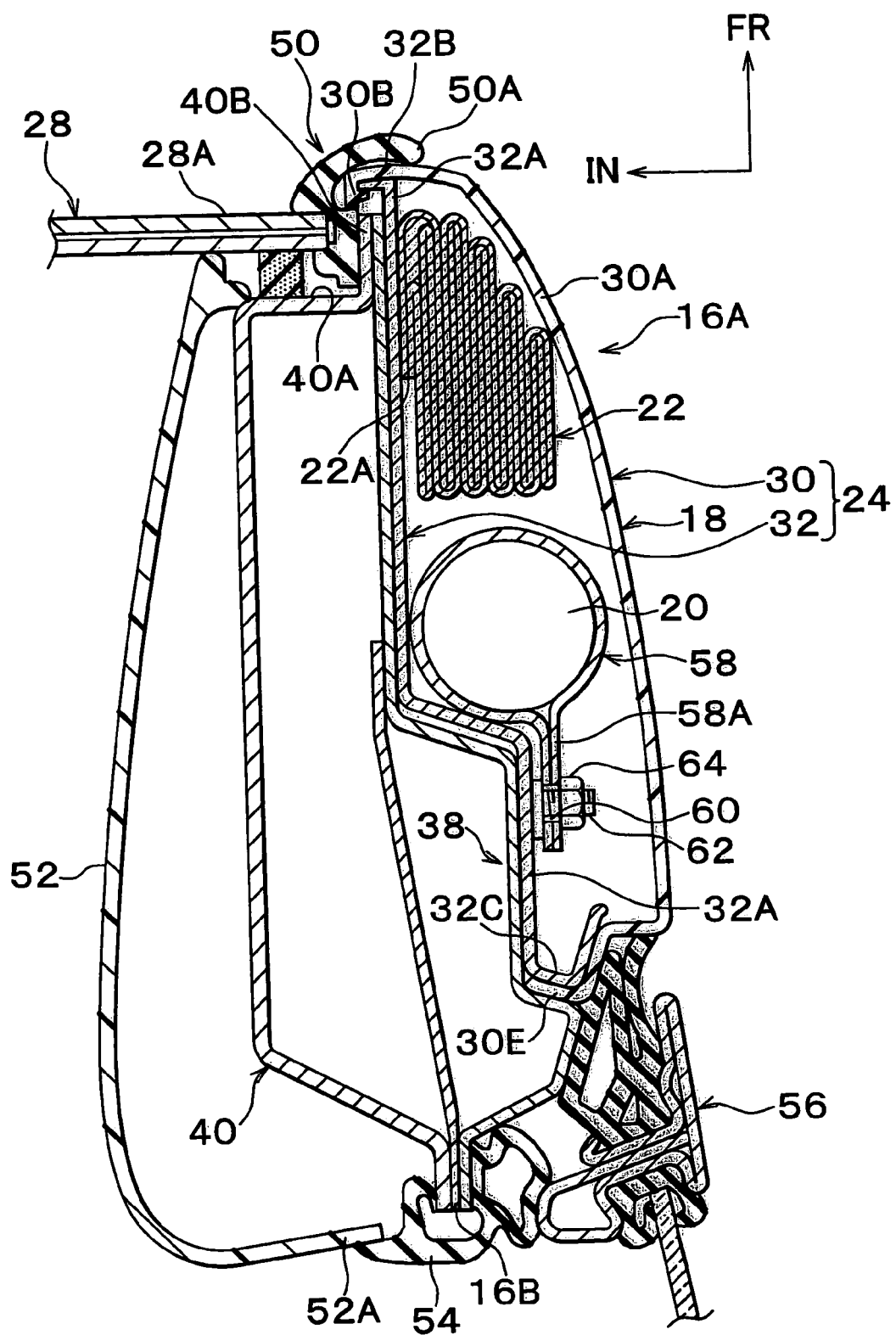
FIG. 2 is an enlarged sectional view taken on line II—II of FIG. 3.

As shown in FIG. 2, an attachment hole 60 is formed in an attachment portion 58A of each of the brackets 58. A bolt 62 is inserted in the attachment hole 60, and the bolt 62 is erected in the inner peripheral surface of the wall portion 32A on the laterally inner side of the base plate 32. A nut 64 is screwed to the bolt 62, and the inflator 20 is fixed to the base plate 32 of the case 24 through the bracket 58.

Next, effects of the first embodiment will be described.

In the first embodiment, when the vehicle-to-pedestrian collision detection sensor 14 detects a collision with a pedestrian, the inflator 20 operates, whereby gas flows into the airbag body 22. Therefore, the airbag body 22 is expanded forward from the upper portion 16A of the front pillar 16 due to the gas flowing from the inflator 20 as shown in FIG. 5. At this time, the pawl portion 30B of the deployment portion 30A in the garnish panel 30 is disengaged from the engagement portion 32B of the base plate 32, and the deployment portion 30A is deployed from the second end portion 30C toward the outer side in the lateral direction.

On the other hand, the expansion of the airbag body 22 toward the outer side of the vehicle (i.e., in the direction shown by the arrow A in FIG. 5) is restrained to a predetermined amount by the cloth 22C connecting the attachment portion 22A with the sewn portion 22B. Thus, the airbag body 22 is expanded along the outer peripheral portion of the vehicle (in the directions shown by the arrow B and the arrow C in FIG. 5). In addition, a portion of the airbag body 22 expanded toward approximately the outer side in the lateral direction (i.e., in the direction shown by the arrow C in FIG. 5) contacts the curved portion 30F expanded toward approximately the inner side in the lateral direction, which is in the deployment portion 30A of the garnish panel 30.

As a result, in the first embodiment, the expansion of the airbag body 22 toward approximately the outer side in the lateral direction (i.e., in the direction shown by the arrow C) is also restrained to a predetermined amount by the curved portion 30F. Therefore, the airbag body 22 is expanded toward approximately the inner side in the lateral direction (i.e., in the direction shown by the arrow B in FIG. 5).

Figure 6:
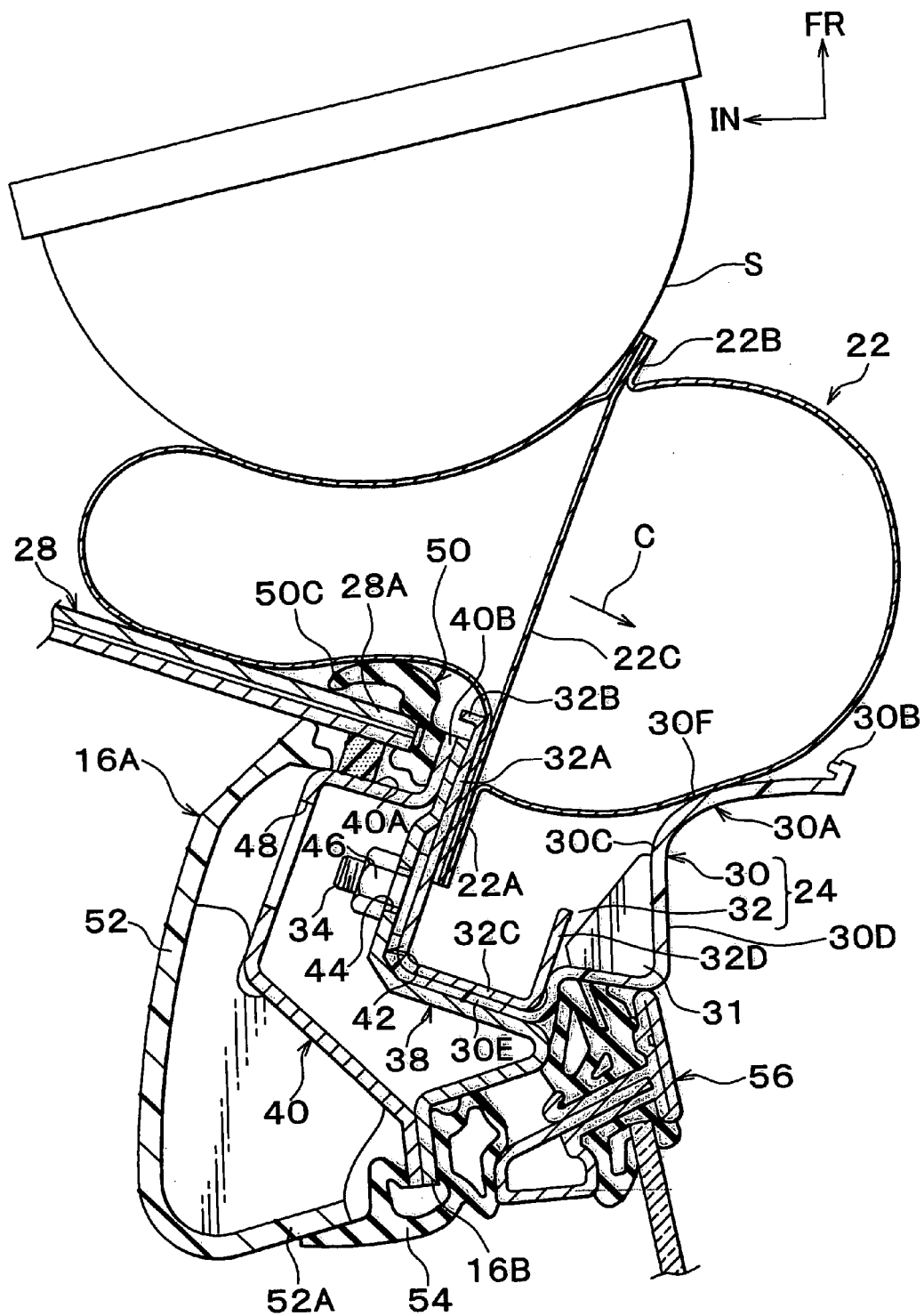
FIG. 6 is a view illustrating effects of the airbag apparatus for pedestrian protection according to the first embodiment of the invention.

In addition, as shown in FIG. 6, even when a colliding object S such as a pedestrian's head contacts the airbag body 22 and the airbag body 22 is about to be moved toward approximately the outer side in the lateral direction (i.e., in the direction shown by the arrow C in FIG. 5), the airbag body 22 is maintained in the expanded position (in the position shown in FIG. 6) by the curved portion 30F and the cloth 22C. This ensures that the airbag body 22 lies between the colliding object S and the upper portion 16A of the front pillar 16, thereby improving the performance of reducing the impact on the colliding object S.

The construction is simplified by using the contact portion contacting the airbag body 22, which is in the deployment portion 30A of the garnish panel 30, as the expanding direction control means.

The thickness of the deployment portion 30A of the garnish panel 30 is uniform without any sudden change or is gradually changing from the end portion 30C on the outer side in the lateral direction from which the deployment portion 30A is deployed to at least the contact portion which contacts the airbag body 22. Thus, the deployment portion 30A of the garnish panel 30 is elastically deformed in the same bending mode as that of a cantilever beam bent from the end portion 30C on the outer side in the lateral direction, instead of being deformed and deployed along a specific bending ridge line like a hinge. Therefore, it is possible to form the curved portion 30F expanded toward approximately the inner side in the lateral direction in the deployment portion 30A of the garnish panel 30.

Figure 7:
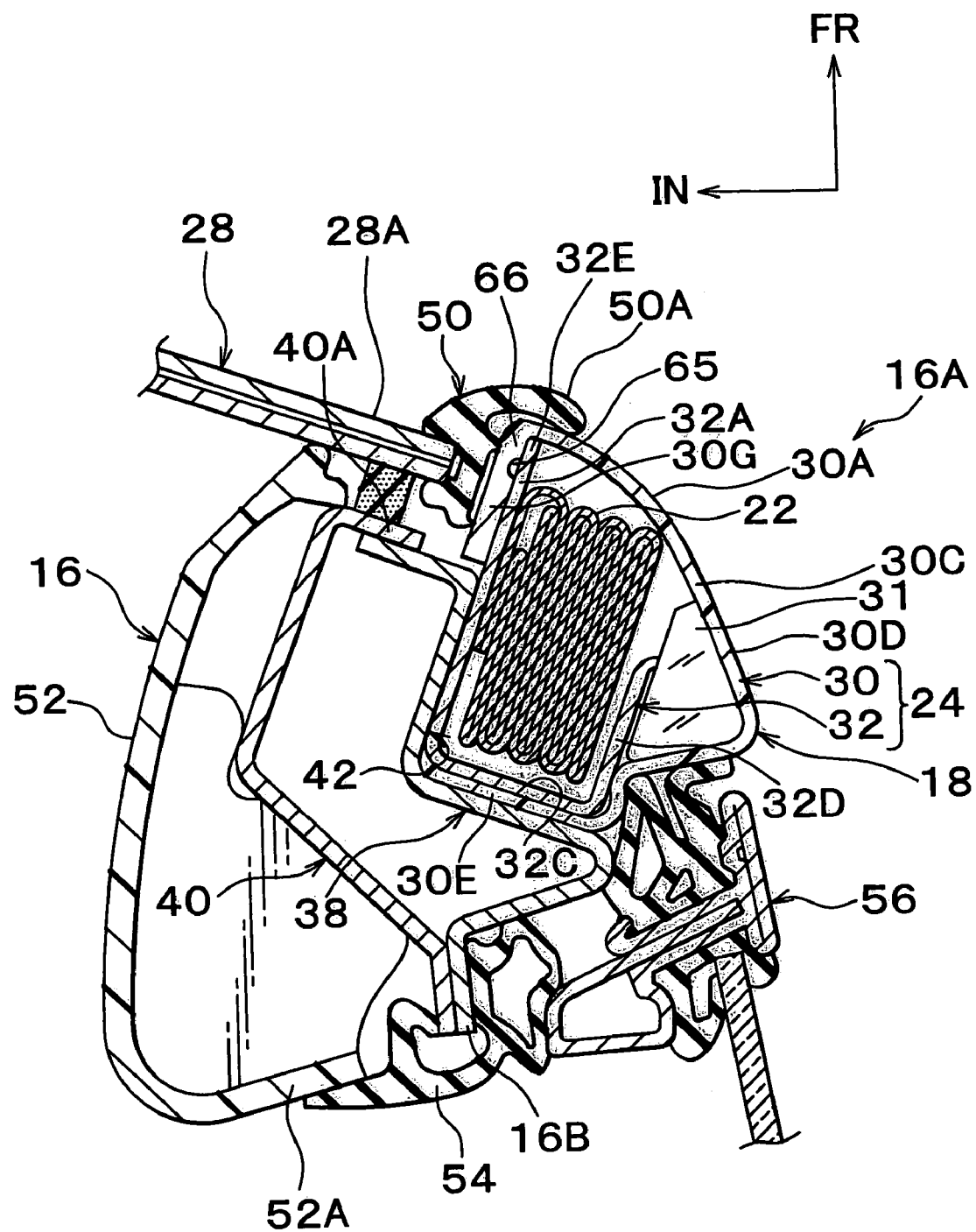
FIG. 7 is an enlarged sectional view showing an airbag apparatus for pedestrian protection according to a modification of the first embodiment of the invention.

In the first embodiment, the pawl portion 30B formed in the deployment portion 30A of the garnish panel 30 is engaged with the engagement portion 32B of the base plate 32, as shown in FIG. 1. Instead, as shown in FIG. 7, an end portion 30G on the laterally inner side of the garnish panel 30, which is bent toward the rear of the vehicle, may be bonded to the outer peripheral surface of the wall portion 32A on the laterally outer side of the base plate 32 by an adhesive which serves also as a sealant. In addition, a brittle portion 66 including a recessed portion 65 may be provided near the bending portion of the end portion 30G so as to be broken when the airbag body is expanded. A tip portion 32E of the wall portion 32A on the laterally inner side of the base plate 32 reaches the deployment portion 30A of the garnish panel 30. Therefore, even if a pressure is applied to the deployment portion 30A from the outer side of the vehicle when the vehicle is used in a general way, for example, when the vehicle is washed, the stress can be prevented from being applied to the brittle portion 66. The brittle portion 66 is sealed together with a gap between the windshield glass 28 and the garnish panel 30 by the weather strip molding 50. Therefore, even if a crack occurs in a part of the brittle portion 66, water and the like can be prevented from entering the brittle portion 66.

Figure 8:
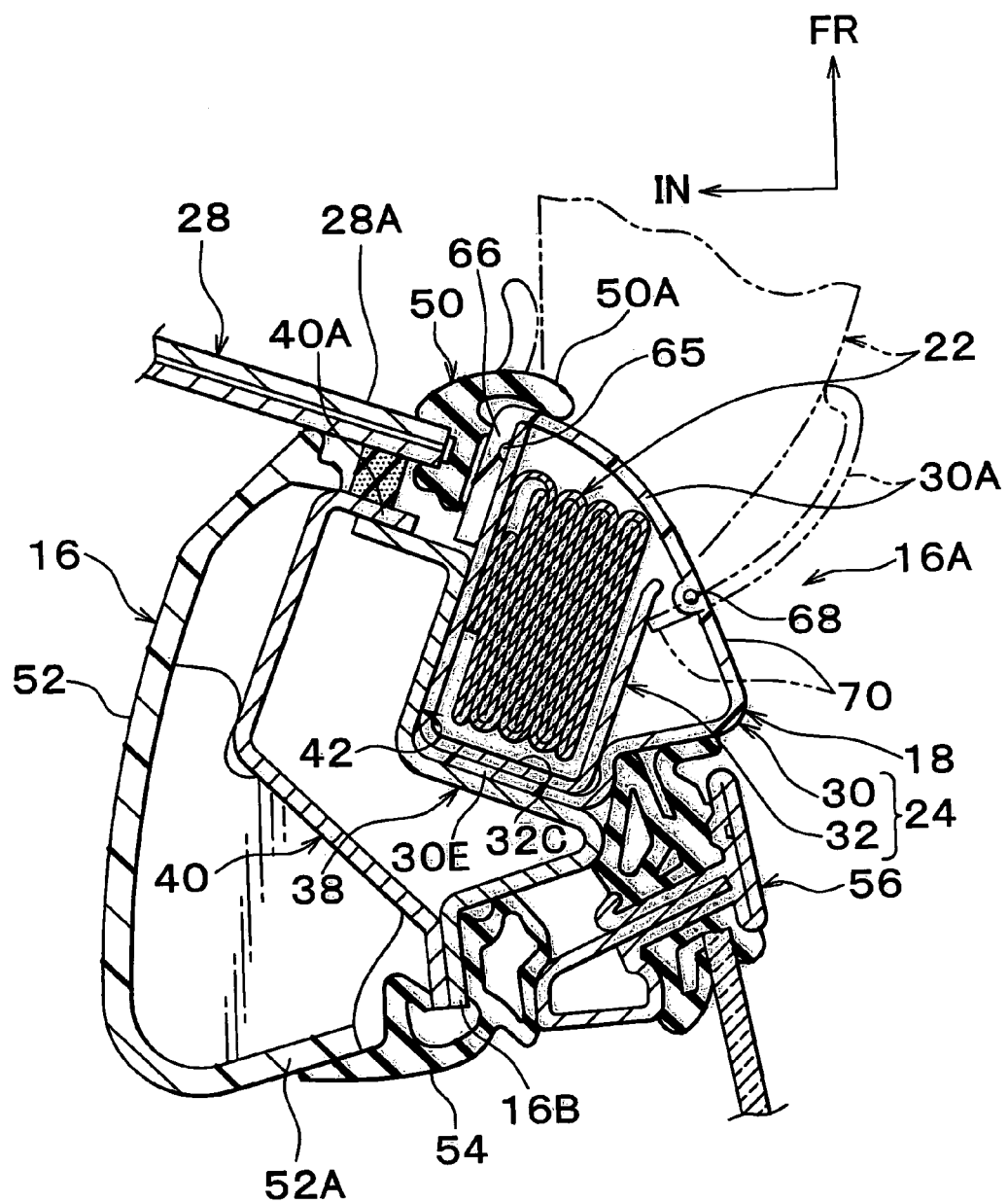
FIG. 8 is an enlarged sectional view showing an airbag apparatus for pedestrian protection according to another modification of the first embodiment of the invention.

In addition, in the first embodiment, the deployment portion 30A of the garnish panel 30 is deployed from the end portion 30C on the outer side in the lateral direction toward the outer side in the lateral direction. Instead, as shown in FIG. 8, the deployment portion 30A of the garnish panel 30 may be rotated around an axis 68 so that an end portion 70 of the deployment portion 30A may contact the wall portion 32D on the laterally outer portion of the base plate 32, thereby controlling the opening angle of the deployment portion 30A.

Next, an airbag apparatus for pedestrian protection according to a second embodiment of the invention will be described with reference to FIG. 9 to FIG. 11.

The same members as those in the first embodiment are denoted with the same reference numerals and the detailed description thereof will be omitted.

Figure 9:
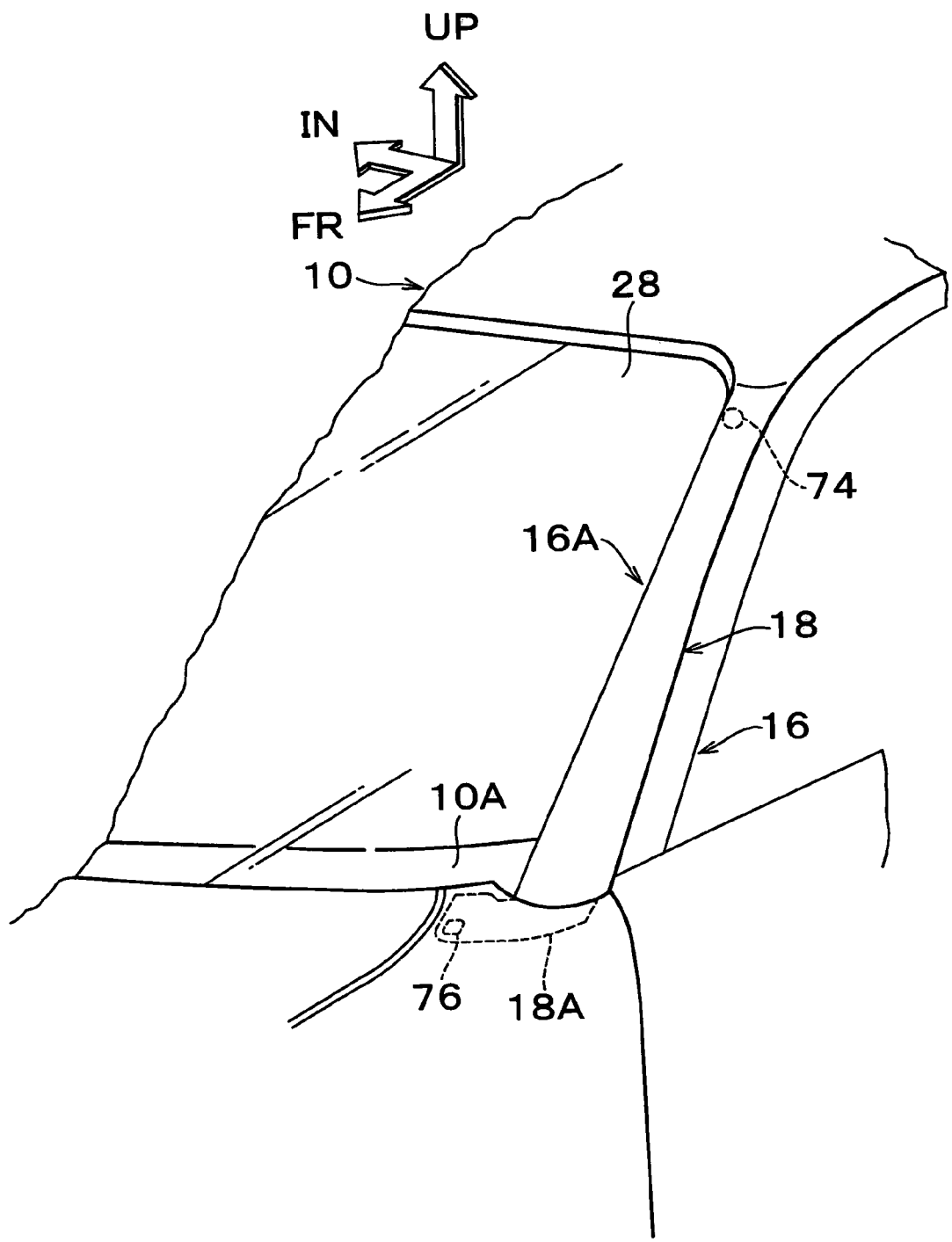
FIG. 9 is a perspective view showing a part of a vehicle body to which an airbag apparatus for pedestrian protection according to a second embodiment of the invention is applied, as obliquely viewed from ahead of the vehicle.

As shown in FIG. 9, in the second embodiment, a lower end portion 18 of an airbag apparatus for pedestrian protection 18 extends along a cowl portion 10A of a vehicle body 10 toward the inner side in the lateral direction.

Figure 10:
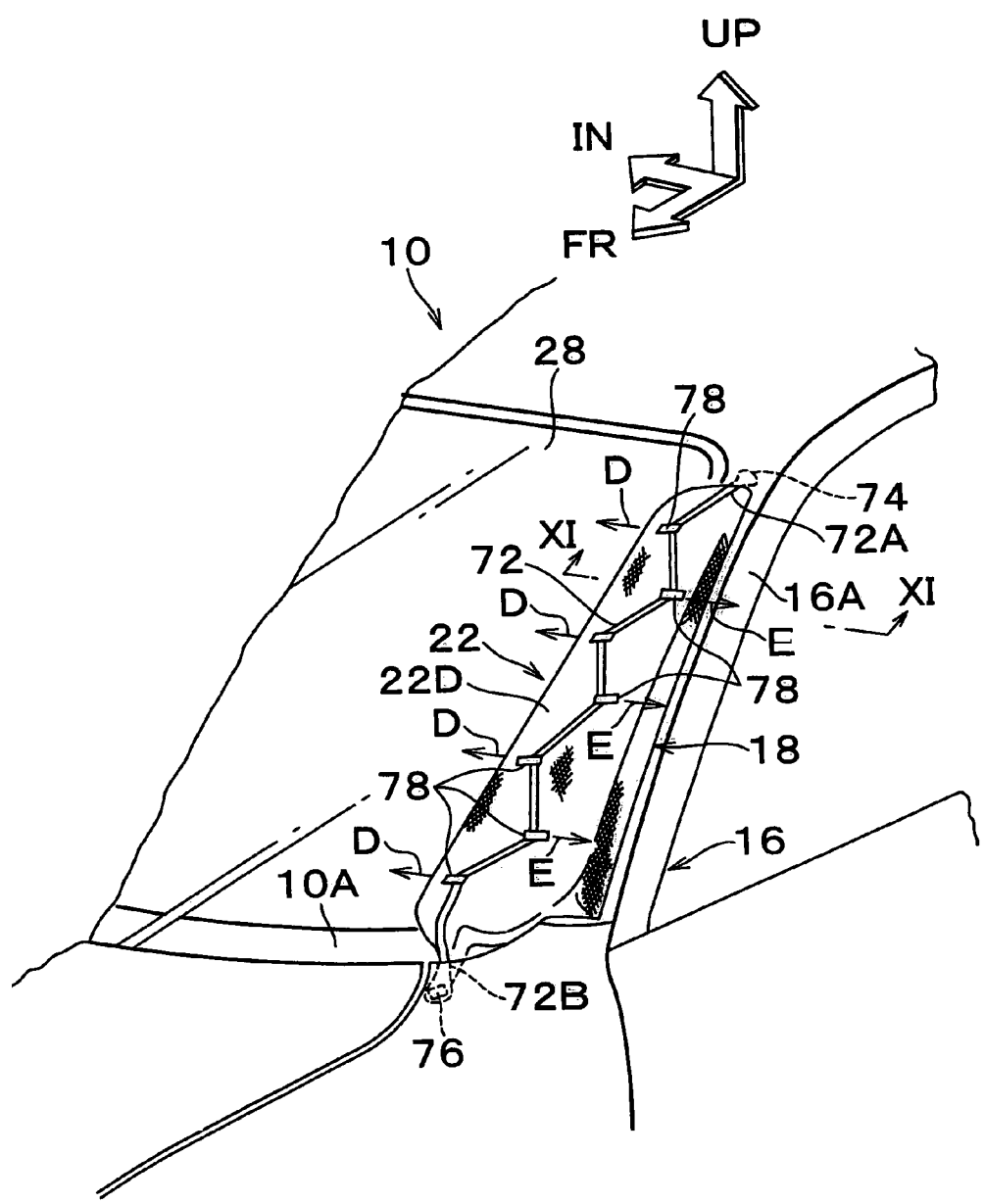
FIG. 10 is a perspective view showing the expanded state of the airbag apparatus for pedestrian protection according to the second embodiment of the invention, as obliquely viewed from ahead of the vehicle.
Figure 11:
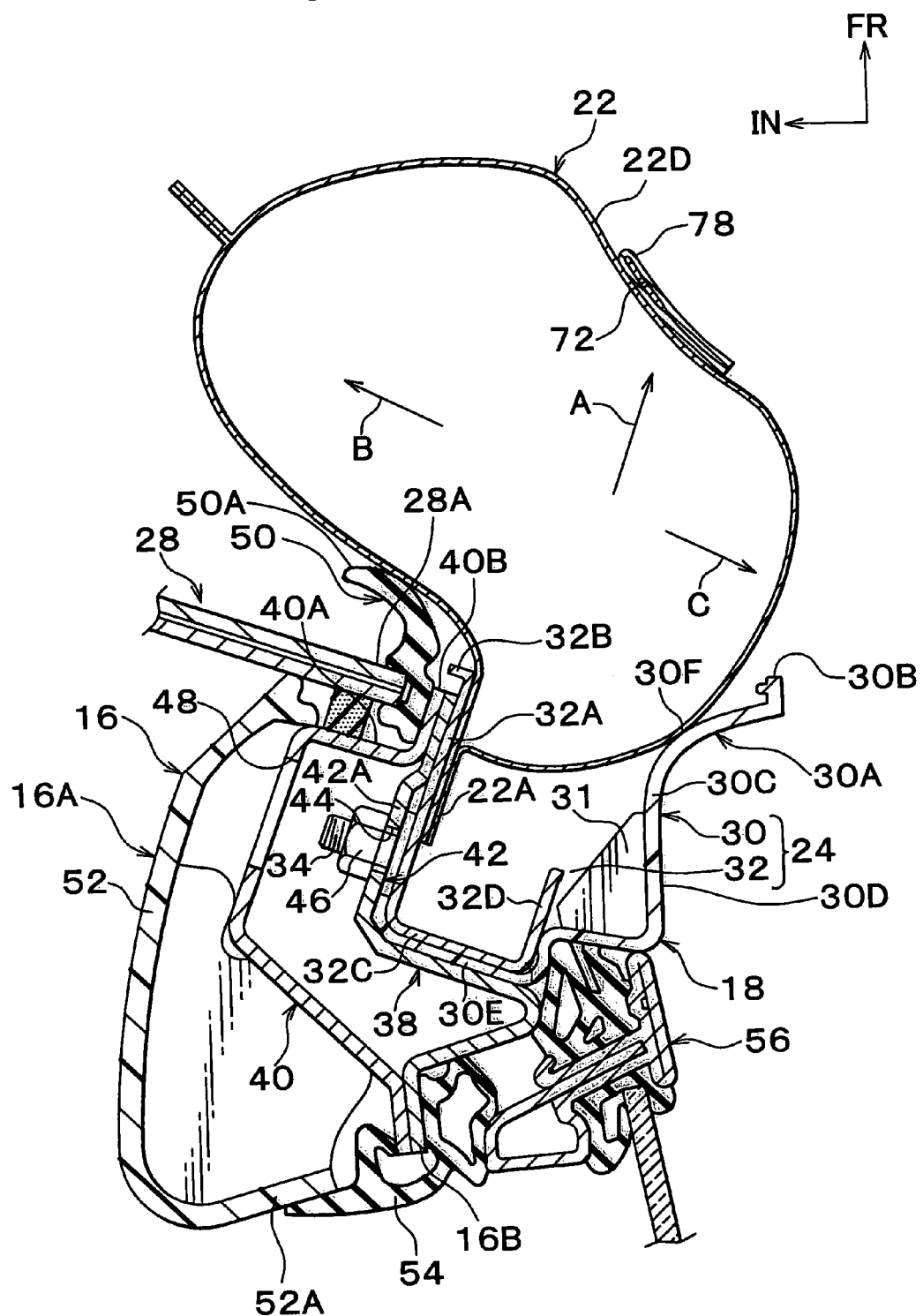
FIG. 11 is an enlarged sectional view taken on line XI—XI of FIG. 10.

As shown in FIG. 10, a strap 72 is disposed in an upper surface 22D of the expanded airbag body 22 as the connecting member which serves as the expanding direction control means. An upper end portion 72A of the strap 72 is connected to an anchor 74 disposed in an upper end portion of the airbag apparatus for pedestrian protection 18. On the other hand, a lower end portion 72B of the strap 72 is connected to an anchor 76 disposed in an end portion on the laterally inner side of the lower end of the airbag apparatus for pedestrian protection 18. The length of the strap 72 is at least equal to or larger than that of the distance between the upper and lower anchors 74 and 76 along a case 24.

Cloth rings 78 are disposed on both sides of a straight line connecting the upper and lower anchors 74 and 76 in a zig zag manner in the upper surface 22D of the expanded airbag body 22. The strap 72 extends through each of the rings 78 along the vertical direction. In the embodiment, as shown in FIG. 11, the cloth 22C restraining the shape of the bag in the first embodiment is eliminated.

Next, effects of the second embodiment will be described.

In the second embodiment, when the airbag body 22 is expanded in the same manner as in the first embodiment, each of the rings 78 disposed in the upper portion 22D of the airbag body 22 is moved in the direction in which the ring 78 becomes apart from the vertically neighboring rings 78 (i.e., the directions shown by an arrow D and an arrow E). As a result, a tension is generated in the strap 72. Therefore, the expansion of the airbag body 22 toward the outer side of the vehicle (i.e., in the direction shown by an arrow A in FIG. 11) is restrained to a predetermined amount by the strap 72. Thus, the airbag body 22 is expanded along the outer peripheral portion of the vehicle (i.e., in the directions shown by an arrow B and an arrow C in FIG. 11). In addition, a portion expanded toward approximately the outer side in the lateral direction (i.e., in the direction shown by the arrow C in FIG. 11) contacts a curved portion 30F expanded toward approximately the inner side in the lateral direction, which is in a deployment portion 30A of a garnish panel 30.

As a result, in the second embodiment, the expansion of the airbag body 22 toward approximately the outer side in the lateral direction (i.e., in the direction shown by an arrow C in FIG. 11) is also restrained to a predetermined amount by the curved portion 30F. Therefore, the airbag body 22 is expanded toward approximately the inner side in the lateral direction (i.e., in the direction shown by the arrow B in FIG. 11).

In addition, even when a colliding object such as a pedestrian's head contacts the airbag body 22 and the airbag body 22 is about to be moved toward approximately the outer side in the lateral direction (i.e., in the direction shown by the arrow C in FIG. 11), the airbag body 22 is maintained in the expanded position (in the position shown in FIG. 11) by the curved portion 30F. This ensures that the airbag body 22 lies between the colliding object and the upper portion 16A of the front pillar 16, thereby improving the performance of reducing the impact on the colliding object.

In the second embodiment, the tension in the strap 72 as the connecting member which serves as the expanding direction control means is generated by expanding the airbag body 22. Instead, the tension may be generated by shortening the strap using a gas pressure from an inflator. Alternatively, the tension may be generated by pulling in one end of the strap using a gas pressure from an inflator. Also, the upper end portion 72A of the strap 72 may be fixed to the airbag body 22.

Next, an airbag apparatus for pedestrian protection according to a third embodiment of the invention will be described with reference to FIG. 12 and FIG. 13.

The same members as those in the first embodiment and the second embodiment are denoted with the same reference numerals, and the detailed description thereof will be omitted.

Figure 12:
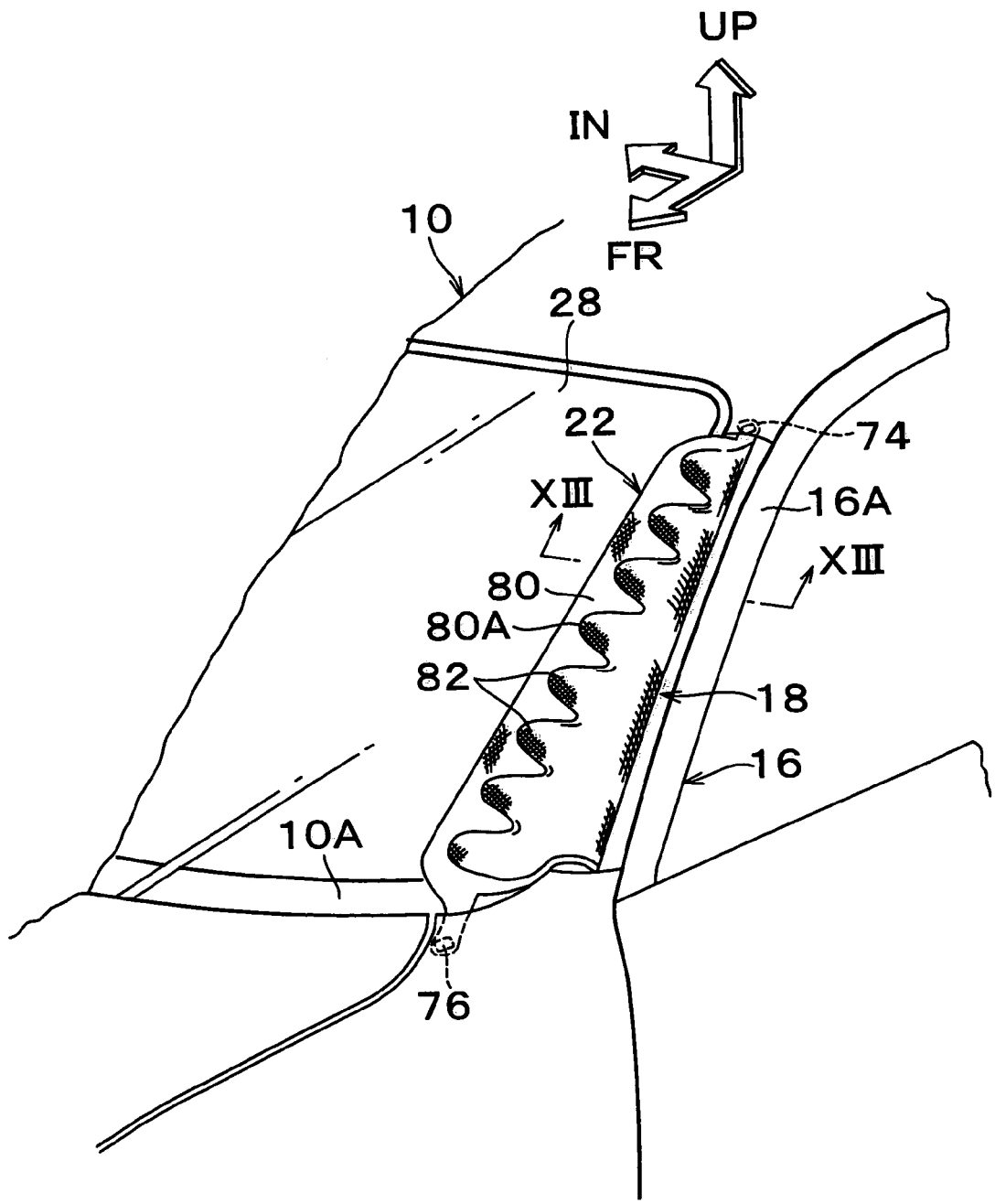
FIG. 12 is a perspective view showing the expanded state of an airbag apparatus for pedestrian protection according to a third embodiment of the invention, as obliquely viewed from ahead of the vehicle.
Figure 13:
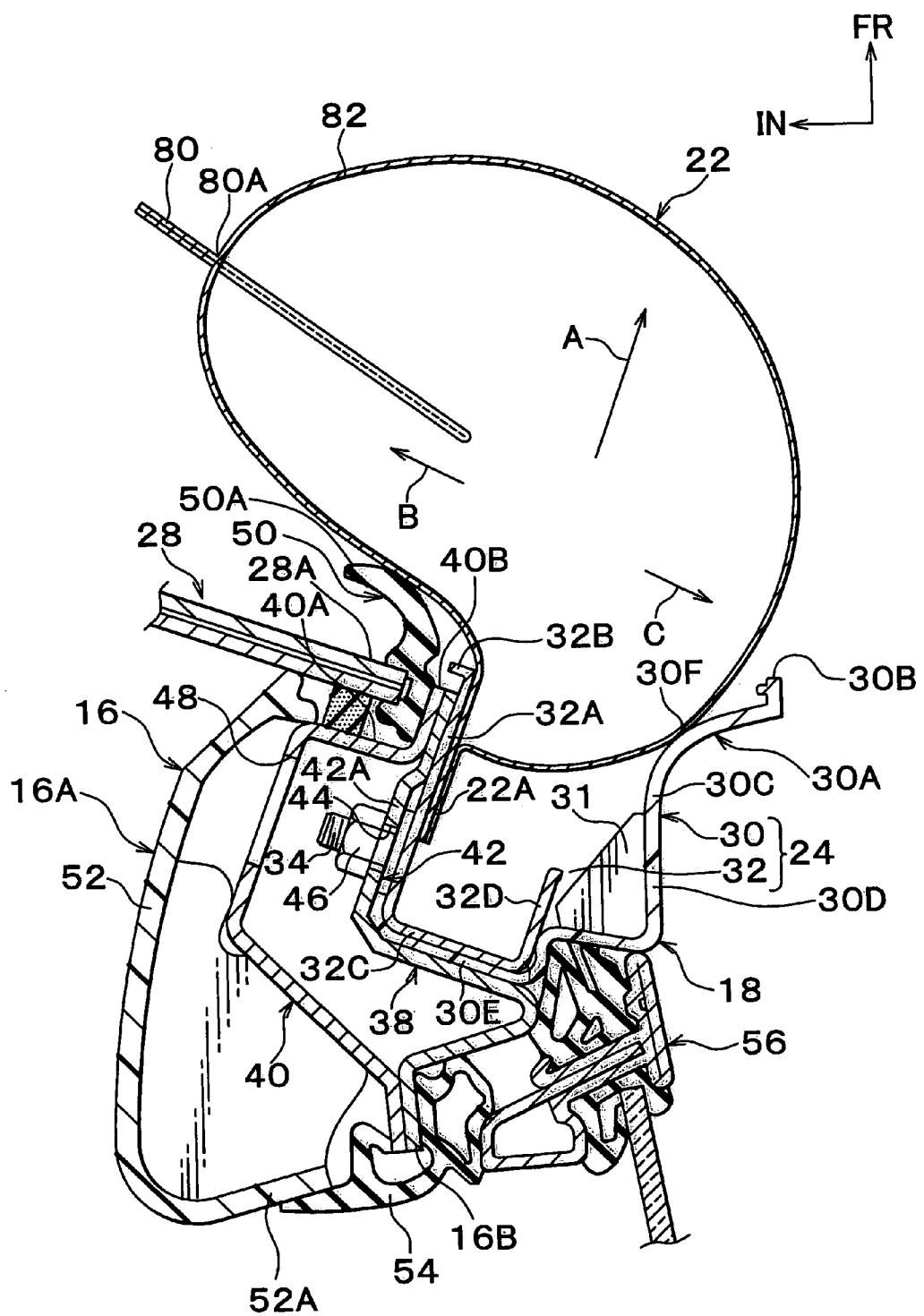
FIG. 13 is an enlarged sectional view taken on line XIII—XIII of FIG. 12.

As shown in FIG. 12, in the third embodiment, a non-expansion portion 80 to which gas does not flow from an inflator is formed in the laterally inner side of the airbag body 22. A boundary 80 between the non-expansion portion 80 and an expansion portion 82 as the expanding direction control means is an edge portion on the laterally outer side of the non-expansion portion 80. The boundary 80A between upper and lower anchors 74 and 76 has a shape consisting of continuous semicircular arcs.

Next, effects of the third embodiment will be described.

In the third embodiment, the non-expansion portions 80 and the expansion portions 82 are alternately formed along the vertical direction in the laterally inner side of the airbag body 22. When the airbag body 22 is expanded in the same manner as in the first embodiment, the vertical distances between the respective expansion portions 82 are reduced. As a result, a tension is generated between the upper and the lower anchors 74 and 76 in the airbag body 22. The expansion of the airbag body 22 toward the outer side of the vehicle (i.e., in the direction shown by an arrow A in FIG. 13) is restrained to a predetermined amount by the tension. Thus, the airbag body 22 is expanded along the outer peripheral portion of the vehicle (i.e., in the directions shown by an arrow B and an arrow C in FIG. 13). In addition, a portion expanded toward approximately the outer side in the lateral direction (i.e., in the direction shown by the arrow C in FIG. 13) contacts a curved portion 30F expanded toward approximately the inner side in the lateral direction, which is in a deployment portion 30A of a garnish panel 30.

As a result, in the third embodiment, the expansion of the airbag body 22 toward approximately the outer side in the lateral direction (i.e., in the direction shown by the arrow C in FIG. 13) is also restrained to a predetermined amount by the curved portion 30F. Therefore, the airbag body 22 is expanded approximately the inner side in the lateral direction (i.e., in the direction shown by the arrow B).

In addition, even when a colliding object such as a pedestrian's head contacts the airbag body 22 and the airbag body 22 is about to be moved toward approximately the outer side in the lateral direction (i.e., in the direction shown by the arrow C in FIG. 13), the airbag body 22 is maintained in the expanded position (in the position shown in FIG. 13) by the curved portion 30F and the boundary BOA between the non-expansion portion 80 and the expansion portion 82. This ensures that the airbag body 22 lies between the colliding object and the upper portion 16A of the front pillar 16, thereby improving the performance of reducing the impact on the colliding object.

Next, an airbag apparatus for pedestrian protection according to a fourth embodiment of the invention with reference to FIG. 14 to FIG. 17.

The same members as those in the first embodiment are denoted with the same reference numerals, and the detailed description thereof will be omitted.

Figure 14:
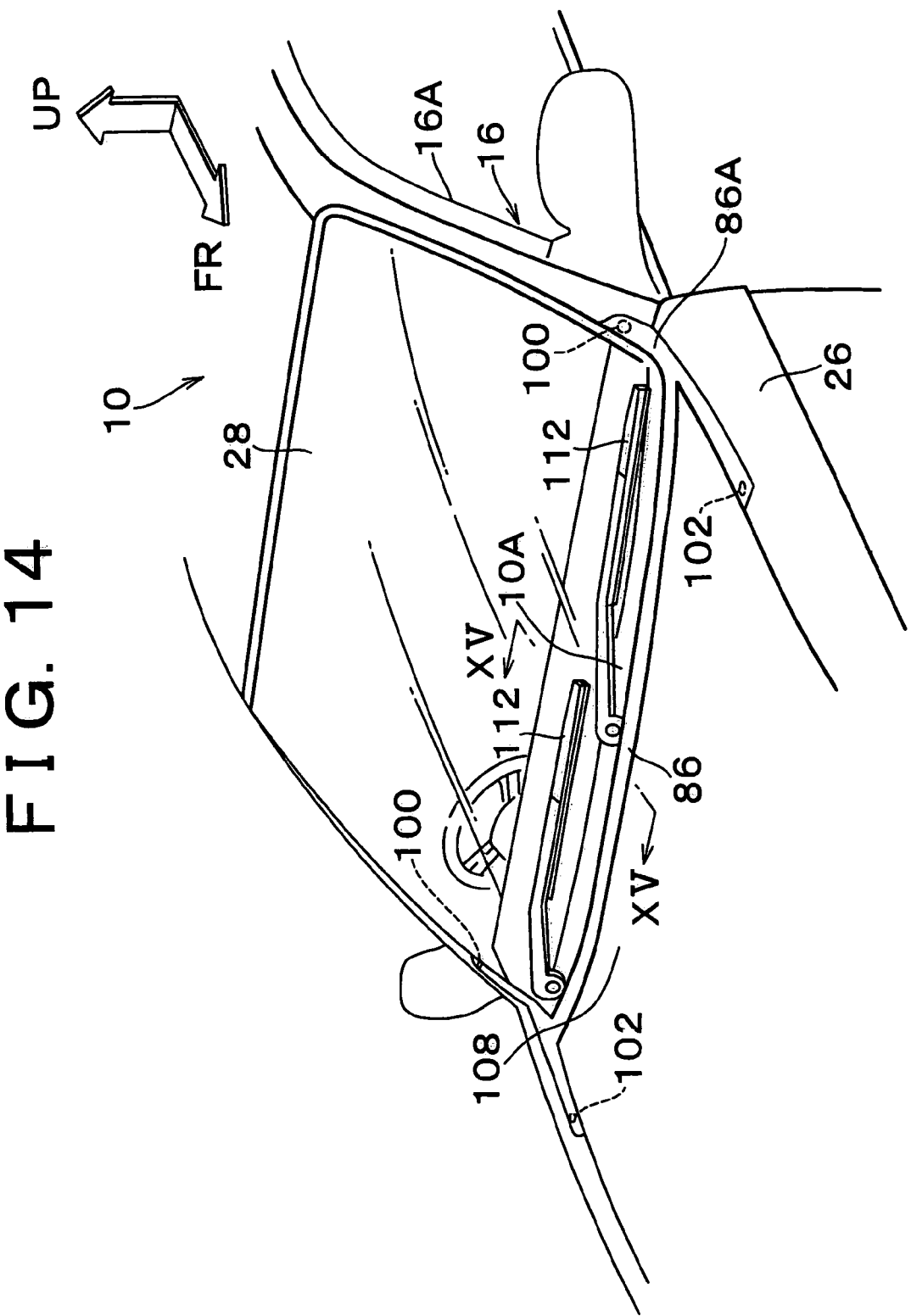
FIG. 14 is a perspective view showing a part of a vehicle to which an airbag apparatus for pedestrian protection according to a fourth embodiment of the invention is applied, as obliquely viewed from ahead of the vehicle.

As shown in FIG. 14, in the fourth embodiment, an airbag apparatus for pedestrian protection 86 laterally extends along a cowl portion 10A of a vehicle body 10. Both end portions 86A of the airbag apparatus for pedestrian protection 86 extends toward the front of the vehicle along a fender 14, and extends toward the rear of the vehicle along an upper portion 16A of a front pillar 16.

Figure 15:
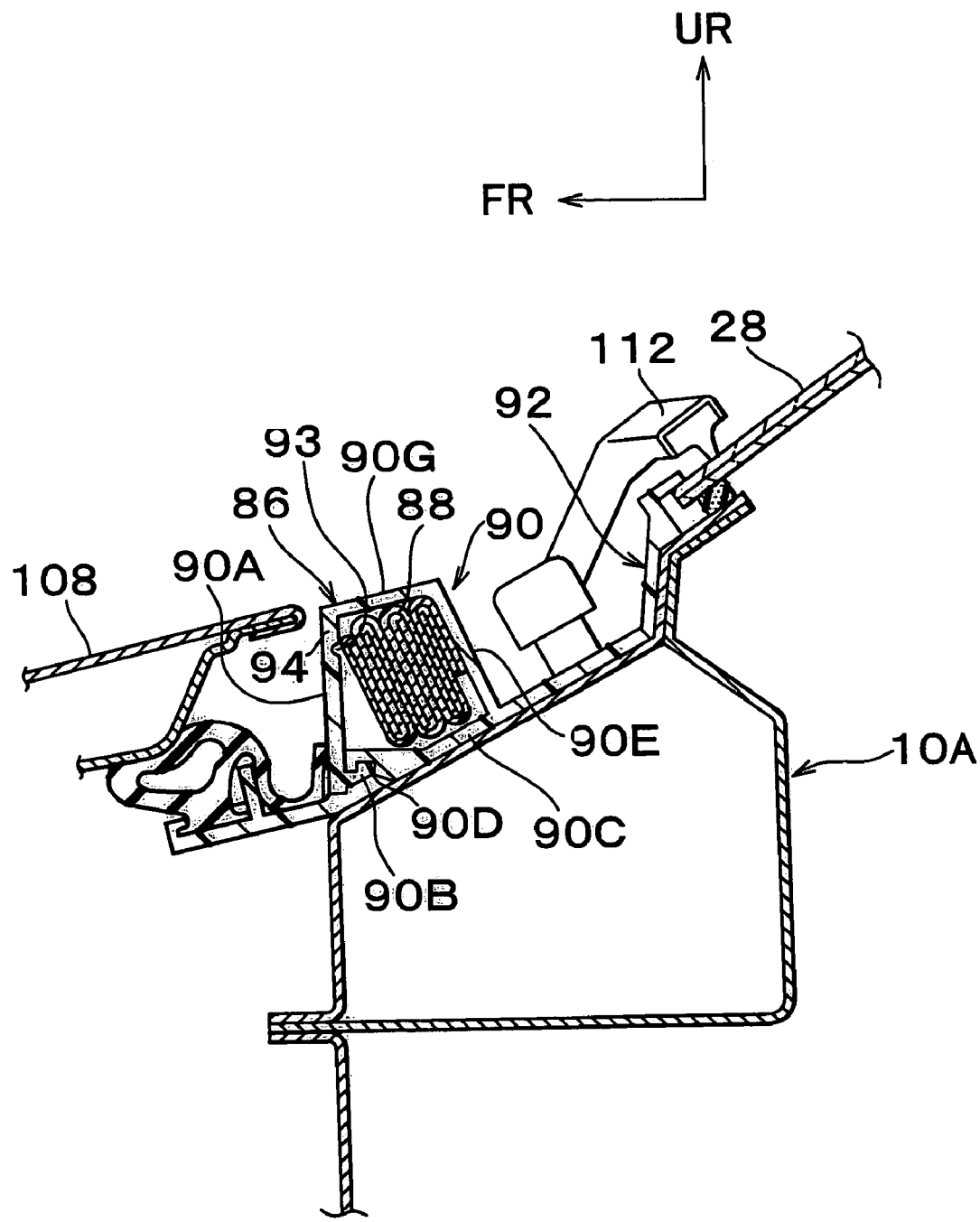
FIG. 15 is an enlarged sectional view taken on line XV—XV of FIG. 14.

As shown in FIG. 15, the airbag apparatus for pedestrian protection 86 mainly includes an inflator (not shown), an airbag body 88, and a case 90 that houses the airbag body 88. When a vehicle-to-pedestrian collision detection sensor detects a collision with a pedestrian, the inflator operates, whereby gas flows into the airbag body 88. The airbag body 88 is expanded toward the upper side of the cowl portion 10A by the gas flowing from the inflator as shown in FIG. 17.

Figure 16:
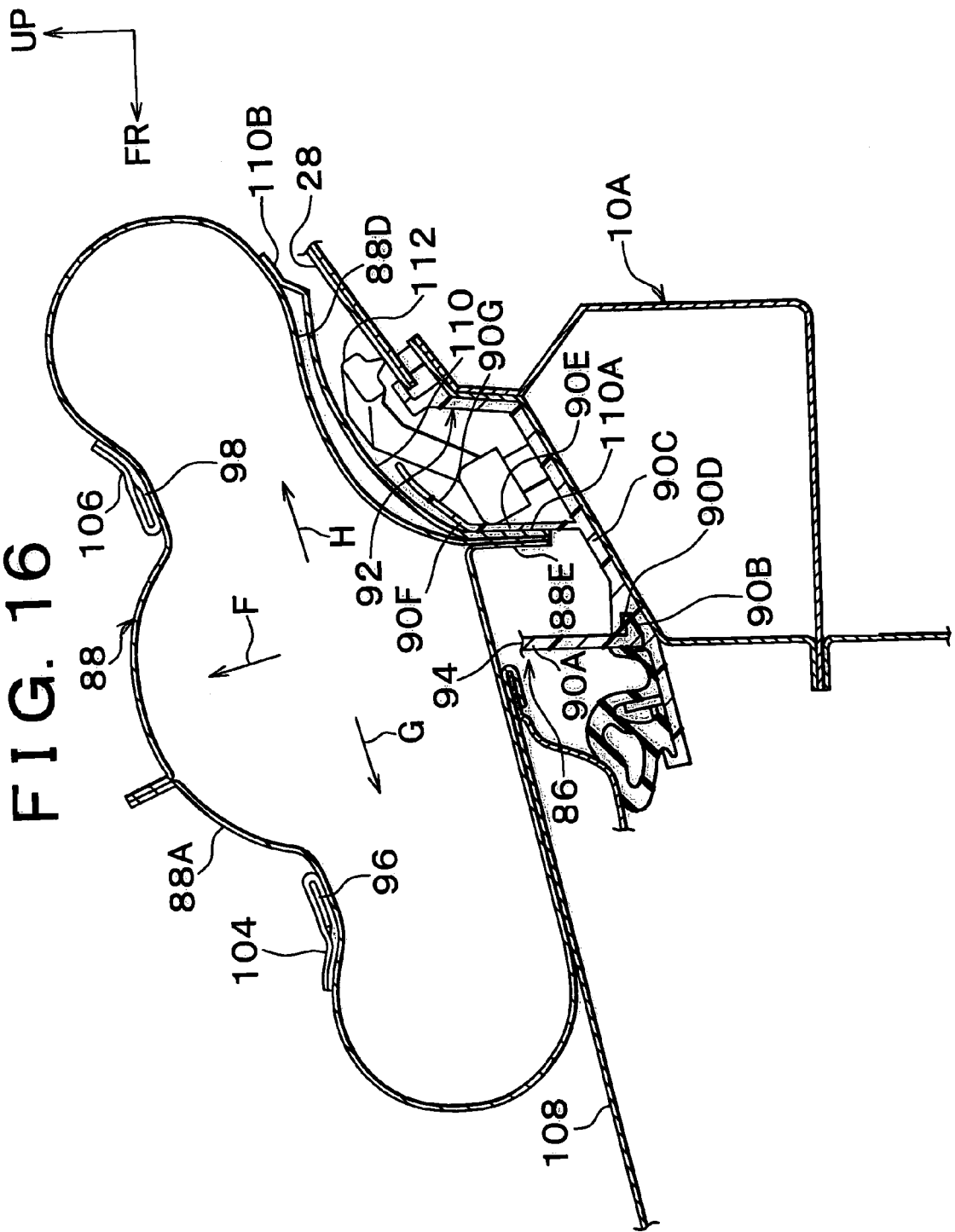
FIG. 16 is an enlarged sectional view taken on line XVI—XVI of FIG. 17.

As shown in FIG. 15, the airbag body 88 is accordian-folded to have a long shape, and is housed in the case 90. The case 90 is formed as a part of resin material 92 constituting an upper portion of the cowl portion 10A. An engagement portion 90B directed toward the rear of the vehicle is formed in a lower end portion of a front wall portion 90A of the case 90. The engagement portion 90B is engaged with an engagement groove 90D formed in a base plate 90C of the case 90. On the other hand, a brittle portion 94 including a recessed portion 93 is provided near an upper end portion of the front wall portion 90A of the case 90. Therefore, when the airbag body 88 is expanded, the brittle portion 94 of the case 90 is broken by the expansion pressure of the airbag body 88 as shown in FIG. 16. Then, a deployment portion 90G is deployed toward the rear of the vehicle with respect to the cowl portion 10A while an upper end portion 90F of a rear wall portion 90E serves as a hinge.

Figure 17:
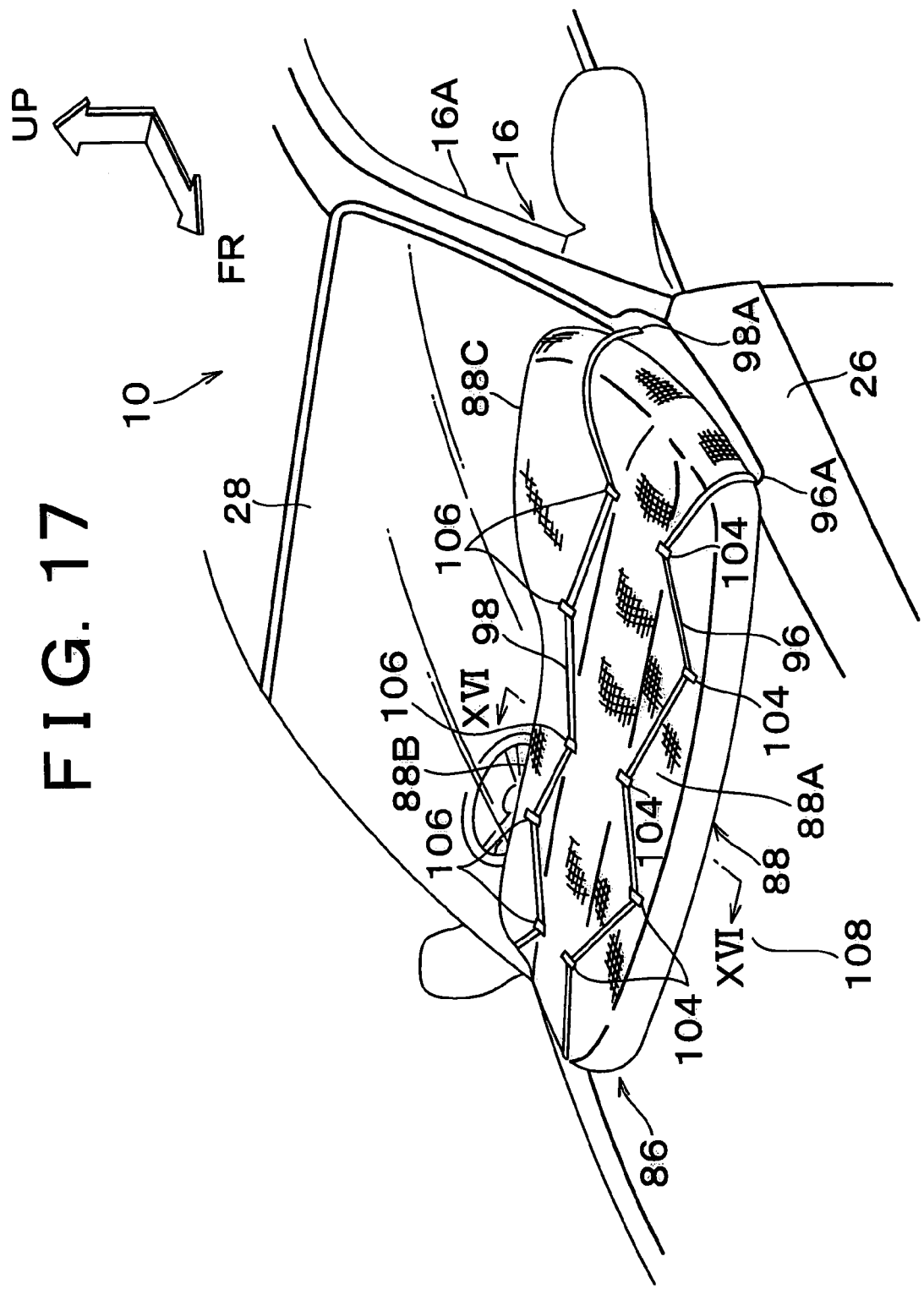
FIG. 17 is a perspective view showing the expanded state of the airbag apparatus for pedestrian protection according to the fourth aspect of the invention, as obliquely viewed from ahead of the vehicle.
Figure 18:
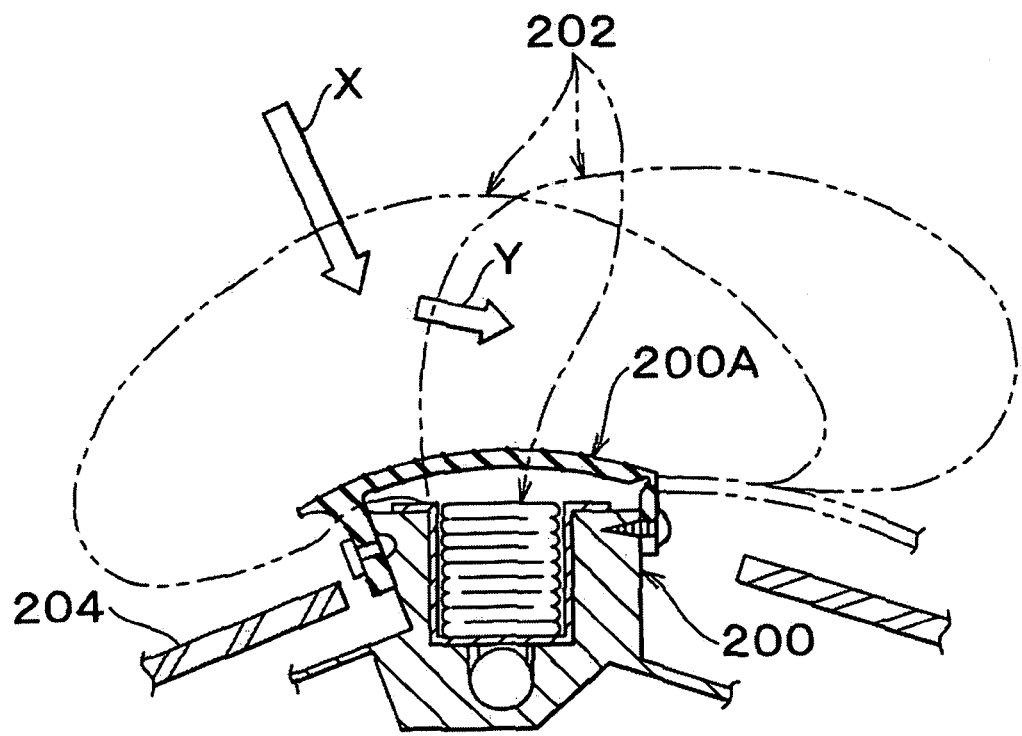
FIG. 18 is a sectional view showing a conventional airbag for pedestrian protection.

As shown in FIG. 17, a strap 96 and a strap 98 as connecting members which serve as expanding direction control means are disposed in an upper surface 88A of the expanded airbag body 88. Respective both ends 96A and 98A of the straps 96 and 98 are connected to anchors 100 and 102 (see FIG. 14) disposed in an upper end portion and a lower end portion of right and left end portions of the airbag apparatus for pedestrian protection 86. The length of each of the straps 96 and 98 is at least equal to or larger than the distance between the right and left anchors 100 and 102.

Cloth rings 104 and 106 are attached on both sides of a straight line connecting the right and left anchors 100 and 102 in a zig zag manner in the upper surface 88A of the expanded airbag body 88. The straps 96 and 98 extend through each of the rings 104 and 106 along the lateral direction.

Thus, the expansion of the airbag body 88 toward the upper portion of the vehicle (i.e., in the direction shown by an arrow F in FIG. 16) is restrained to a predetermined amount by a tension generated between the connected portions. Therefore, the airbag body 88 is deployed to have a flat shape, and is pressed against the cowl portion 10A, windshield glass 28 and a hood 108 so as to be restrained.

With regard to portions of the airbag body 88 expanded toward the windshield glass 28 side, a portion 88C on the passenger seat side is larger than a portion 88B on the driver's seat side so that the view on the driver's seat side may not be obstructed, and a pedestrian may be protected in a large area on the passenger seat side.

As shown in FIG. 16, an additional cloth 110 is disposed in a portion of a lower surface 88D on the vehicle rear side of the expanded airbag body 88. A lower end edge portion 110A of the additional cloth is connected between a rear wall portion 90E of the case 90 and a connecting portion 88E of the airbag body 88. An upper end edge portion 110B of the additional cloth 110 is connected to the lower surface 88D of the airbag body 88 above a wiper 112 in a retracted position. If the additional cloth 110 is caught on the wiper 112 at the time of deployment, the additional cloth 110 can be easily separated from the airbag body 88. Thus, the airbag body 88 is not directly caught on the wiper 112.

Next, effects of the fourth embodiment will be described.

In the fourth embodiment, when a vehicle-to-pedestrian collision detection sensor detects a collision with a pedestrian, an inflator operates, whereby gas flows into the airbag body 88. Therefore, the airbag body 88 is deployed over the cowl portion 10A, the windshield glass 28 and the hood 108. At this time, as shown in FIG. 16, a brittle portion 94 of a case 90 is broken by the expansion pressure of the airbag body 88, and a deployment portion 90G is deployed toward the rear of the vehicle while an upper end portion 90F of a rear wall portion 90E serves as a hinge.

On the other hand, the expansion of the airbag body 88 toward approximately the upper side of the vehicle (i.e., in the direction shown by an arrow F in FIG. 16) is restrained to a predetermined amount by straps 96 and 98. Thus, the airbag body 88 is expanded toward approximately the front of the vehicle (i.e., in the direction shown by an arrow G in FIG. 16) and toward approximately the rear of the vehicle (i.e., in the direction shown by an arrow H in FIG. 16).

In addition, even when a colliding object such as a pedestrian's head contacts the airbag body 88 and the airbag body 88 is about to be moved toward approximately the rear of the vehicle (i.e., in the direction shown by the arrow H in FIG. 16), the airbag body 88 is maintained in the expanded position (in the position shown in FIG. 16) by the straps 96 and 98. This ensures that the airbag body 88 lies among the colliding object S, the cowl portion 10A, the windshield glass 28, and hood 108, thereby improving the performance of reducing the impact on the colliding object S.

Further, if the additional cloth 110 is caught on the wiper 112 when the airbag body 88 is deployed, the additional cloth 110 can be easily separated from the airbag body 88. Thus, the airbag body 88 is not directly caught on the wiper 112, and can be expanded reliably and promptly.

In the fourth embodiment, the tension in the strap 96 as the connecting member which serves as the expanding direction control means is generated by expanding the airbag body 88. Instead, the tension may be generated by shortening the strap using a gas pressure from an inflator. Alternatively, the tension may be generated by pulling in one end of the strap using a gas pressure from an inflator. Also, one end portion of the strap may be fixed to the airbag body.

While the specific first to fourth embodiment of the invention have been described in detail, it is obvious to those skilled in the art that the invention is not limited to the foregoing embodiments, and that various changes and modifications may be made within the true spirit of the invention.

What is claimed is:

1. An airbag apparatus for pedestrian protection which expands an airbag body toward an exterior of a vehicle body, comprising:
    a cover which covers the airbag body, the cover including a base plate located at a portion of the vehicle body and a deployment portion which is separated from the base plate when the airbag body is expanded; and
    a connecting member which connects a portion of the vehicle body with the airbag body, and which generates a tension between a connected portion of the portion of the vehicle body to which the connecting member is connected and a connected portion of the airbag body to which the connecting member is connected when the airbag body is expanded, the tension serving to maintain the airbag body in the expanded position.

2. The airbag apparatus according to claim 1, wherein the airbag body covers a front pillar of the vehicle when the airbag body is expanded.

3. The airbag apparatus according to claim 2, wherein the deployment portion of the cover includes a contact portion which contacts the airbag to prevent the airbag body from expanding toward an outer side in a lateral direction with respect to the front pillar, and which maintains the airbag body in the expanded position.

4. The airbag apparatus according to claim 3, wherein the contact portion of the deployment portion generates a resistance force resisting a force of the airbag body acting toward an outer side in a lateral direction when the airbag body is expanded.

5. The airbag according to claim 3, wherein the contact portion of the deployment portion restrains expansion of the airbag body toward approximately an outer side in a lateral direction to a predetermined amount.

6. The airbag apparatus according to claim 3, wherein the contact portion is a curved portion expanded toward an inner side in a lateral direction, which is in the deployment portion of the cover.

7. The airbag apparatus according to claim 2, wherein the connecting member generates a tension which affects the airbag body, and which serves to restrain expansion of the airbag body toward an outer side of the vehicle.

8. The airbag apparatus according to claim 2, wherein a rib is provided at an inner surface of the cover.

9. The airbag apparatus according to claim 2, wherein the connecting member connects a portion of the vehicle body laterally inside the front pillar with the airbag body, and which generates a tension between a connected portion of the portion of the vehicle body to which the connecting member is connected and a connected portion of the airbag body to which the connecting member is connected when the airbag body is expanded.

10. The airbag apparatus according to claim 9, wherein the connecting member is a strap extending along the front pillar in an upper surface of the airbag body, an upper end portion of the strap is connected to a portion of the vehicle located on an upper end side of the airbag apparatus, a lower end portion of the strap is connected to a portion of the vehicle laterally inside the front pillar.

11. The airbag apparatus according to claim 2, further comprising:
    a weather strip molding covering a portion where the deployment portion is separated from the base plate when the deployment portion is expanded.

12. The airbag apparatus according to claim 2, wherein the deployment portion is engaged with the base plate, when the airbag body is housed and the deployment portion is disengaged from the base plate when the airbag body is expanded so that the deployment portion is separated from the base plate when expanded, and wherein the airbag apparatus further comprises a weather strip molding covering a portion where the deployment portion is engaged with the base plate.

13. The airbag apparatus according to claim 2, wherein the deployment portion is integrally attached to an end portion via a part which is weaker than the deployment portion and the end portion, the end portion being fixed to the base plate, the part is broken so that the deployment portion is separated from the base plate to expanded, and the airbag apparatus further comprises a weather strip molding covering the part wherein the deployment portion is attached to the end portion.

14. The airbag apparatus according to claim 1, wherein the airbag body covers a cowl portion of the vehicle when the airbag body is expanded.

15. The airbag apparatus according to claim 14, wherein the connecting member expands the airbag body toward a front of the vehicle with respect to the cowl position, and which maintains the airbag body in the expanded position.

16. The airbag apparatus according to claim 14, wherein the connecting member generates a resistance force resisting a force of the airbag body acting toward an upper side of the vehicle when the airbag body is expanded.

17. The airbag apparatus according to claim 14, wherein the connecting member restrains expansion of the airbag body toward an upper side of the vehicle to a predetermined amount.

18. The airbag apparatus according to claim 14, wherein the connecting member connects a portion of the vehicle ahead of the cowl portion with the airbag body, and which generates a tension between a connected portion of the portion of the vehicle to which the connecting member is connected and a connected portion of the airbag body to which the connecting member is connected when the airbag body is expanded.

19. The airbag apparatus according to claim 14, wherein the connecting member is a strap extending along the cowl portion in an upper surface of the airbag body, and a first end portion of the strap is connected to portion of the vehicle on a right side in a lateral direction, a second end portion of the strap is connected to a portion of the vehicle on a left side in a lateral direction.

20. The airbag apparatus according claim 14, further comprising:
   a separation cloth which is attached to the airbag body, and which is separated from the airbag body if the airbag body is caught on a protruding portion on the vehicle body side when the airbag body is expanded.

21. The airbag apparatus according to claim 14, further comprising:
   a cloth disposed to lie between the airbag body and a windshield glass of the vehicle when the airbag body is expanded.

22. The airbag apparatus according to claim 14, wherein an upper end of a portion of the airbag body expanded on a driver's seat side is lower than an upper end of a portion of the airbag body expanded on a passenger seat side, when the airbag body is expanded.

23. The airbag apparatus according to claim 1, wherein expansion of the airbag body toward an outer side of the vehicle is restrained to a predetermined amount by the tension.

* * * * *